US006637345B1

(12) United States Patent  (10) Patent No.: US 6,637,345 B1
Reaser  (45) Date of Patent: Oct. 28, 2003

(54) ISOLATED AXLE MOUNTING

(75) Inventor: Howard Reaser, Columbia City, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/269,325

(22) Filed: Oct. 11, 2002

(51) Int. Cl.$^7$ ................................................ B61F 5/26
(52) U.S. Cl. ..................................................... 105/218
(58) Field of Search ........................... 105/218.1, 224.1, 105/218.2, 215.1, 169, 170, 180, 199.5, 220, 225; 280/124.177, 124.116, 124.118, 124.1, 124.157; 267/281, 141.3, 141.2, 141.7, 140.1, 292, 141, 293; 384/220, 222

(56) References Cited

U.S. PATENT DOCUMENTS

| 2,137,543 A | 11/1938 | Piron ....................... 105/224.1 |
| 2,907,579 A | * 10/1959 | Masser ................. 280/124.177 |
| 3,895,586 A | 7/1975 | Willetts ................... 105/224.1 |
| 3,984,125 A | 10/1976 | Paton et al. ................ 280/716 |
| 4,136,620 A | 1/1979 | Scheffel et al. ............. 105/168 |
| 4,589,347 A | 5/1986 | Colford et al. ........... 105/224.1 |
| 4,595,216 A | * 6/1986 | Ware ....................... 280/86.75 |
| 5,630,575 A | 5/1997 | Koyanagi et al. ........ 267/140.3 |
| 5,810,337 A | 9/1998 | McLaughlin ............. 267/141.4 |
| 6,241,266 B1 | * 6/2001 | Smith et al. .......... 280/124.116 |
| 6,425,593 B2 | * 7/2002 | Fabris et al. ................ 280/104 |

* cited by examiner

Primary Examiner—S. Joseph Morano
Assistant Examiner—Frantz F. Jules
(74) Attorney, Agent, or Firm—Dykema Gossett PLLC

(57) ABSTRACT

The present invention provides an isolated axle mount for mounting an axle to a frame of a vehicle. In this embodiment, the axle mount includes a first member rigidly coupled to the frame, a second member rigidly coupled to the axle, and a third member supported by the first and second side walls of the second member. An elastic element such as a bushing is disposed about the third member and is coupled to the first member. At least one axle mount is coupled to the fore side of the axle and at least one axle mount is coupled to the aft side of the axle for supporting a frame above the axle. The elastic nature of the coupling between the axle and frame of the present invention dampens vibrations and lessens overall vehicle noise.

12 Claims, 2 Drawing Sheets

ISOLATED AXLE MOUNTING

FIELD OF INVENTION

The present invention relates to an isolated axle mounting system, and specifically to an isolated axle mounting system suitable for use on off-highway vehicles.

BACKGROUND

Typical beam axle mounting systems utilize some combination of coils springs, or leaf springs, shock absorbers, and torsion bars to isolate the passenger from bumps in the road and dampen oscillations between the frame and axle systems. Some "off-highway" type vehicle applications, however, do not require traditional springs and shock absorbers and the frame is instead rigidly mounted to the axle. These vehicles include construction, agriculture, forestry, underground mining, material handling, and outdoor leisure and utility vehicle, specialty vehicles and other applications. The axle in some off-highway applications may include flotation type tires to absorb some shock. However, vibrations are not dampened as in traditional systems due to the rigid coupling of the axle to the frame and causing the vehicles tend to be noisy.

U.S. Pat. No. 4,136,620 relates to railway vehicles and in particular to suspensions for such vehicles and provides an elastic element between an adaptor and a load-bearing structure. A single adaptors is located outboard of each rail wheel and is mounted on the wheel bearings. The adaptor is fastened to the frame with a fastener, requiring modification of the frame to include apertures for receiving the fastener. The elastic elements appear to be supported only by horizontal flanges of the adaptors and the side frames are supported on the elastic elements. The elastic element is provided as a sandwich of alternate layers of metal plates and rubber forming an elongated block. This device and mounting configuration are, however, not directed to the load demands of off-highway vehicles. Further and among other things, the elastic element includes sandwiched layers requiring an elastic to metal interface that increases manufacturing complexity and cost and may be susceptible to separation in other load applications.

The inventor of the present invention has recognized the need for a device for mounting an axle and frame that will be suitable for use in a wide variety of off-highway vehicles having a wide variety of axle and frame configurations.

SUMMARY OF INVENTION

The present invention provides an isolated axle mount for mounting an axle to a frame of a vehicle. In this embodiment, the axle mount includes a first member rigidly coupled to the frame, a second member rigidly coupled to the axle, and a third member supported by the first and second side walls of the second member. An elastic element such as a bushing is disposed about the third member and is coupled to the first member. At least one axle mount is coupled to the fore side of the axle and at least one axle mount is coupled to the aft side of the axle for supporting a frame above the axle. The elastic nature of the coupling between the axle and frame of the present invention dampens vibrations and lessens overall vehicle noise. Further the first member, second member and third member can be utilized in a variety of applications and require little or no modification to account for the size and shape of the axle and frame being mounted together. The elastic element can be readily modified for varying load carrying requirements.

Other aspects of the present invention are provided with reference to the figures and detailed description of embodiments provided herein.

BRIEF DESCRIPTION OF DRAWINGS

The present invention will now be described, by way of example, with reference to the accompanying drawings, in which.

DETAILED DESCRIPTION

Figure 1:
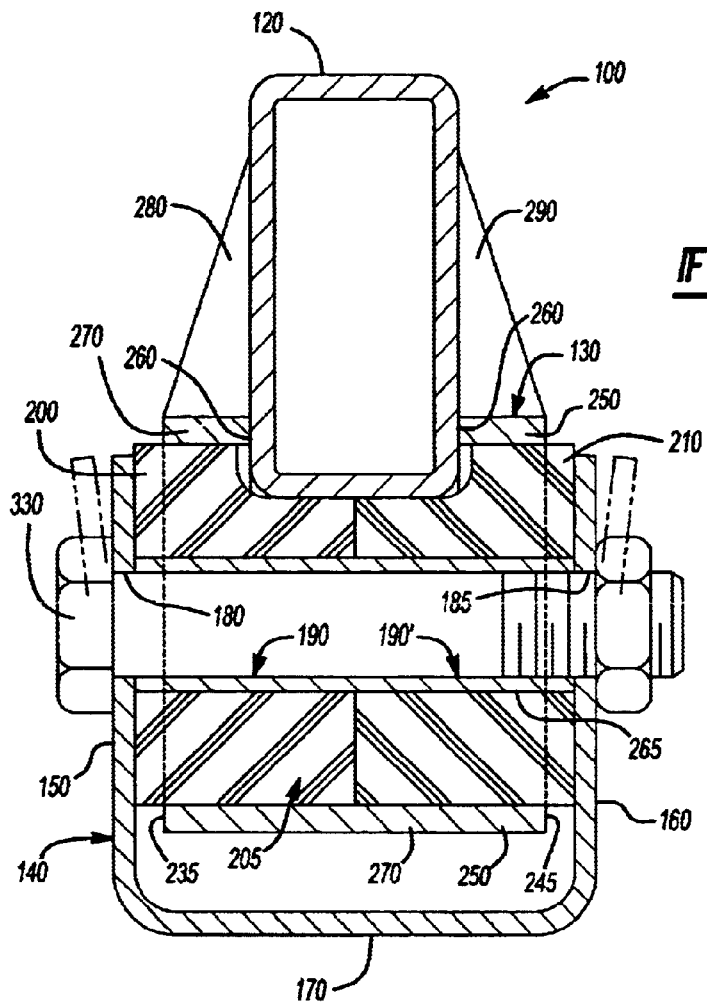
FIG. 1 illustrates a side view of an embodiment of an axle mount.

FIG. 1 illustrates a side view of an embodiment of an axle mount 100 for mounting an axle 110 to a frame 120 of a vehicle. In this embodiment, the axle mount 100 includes a first member 130 rigidly coupled to the frame 120, a second member 140 rigidly coupled to the axle 110, and a third member 190 supported by the first and second side walls 150, 160 of the second member 140. An elastic element 205 such as a bushing is disposed about the third member 190 and is coupled to the first member 130. At least one axle mount 100 is coupled to the fore side 220 of the axle 110 and at least one axle mount 100 is coupled to the aft side 240 of the axle 110 for supporting a frame 120 above the axle 110. The elastic nature of the coupling between the axle 110 and frame 120 of the present invention dampens vibrations and lessens overall vehicle noise. Further the first member 130, second member 140 and third member 190 can be utilized in a variety of applications and require little or no modification to account for the size and shape of the axle 110 and frame 120 being mounted together. The elastic element 205 can be readily modified for varying load carrying requirements.

According to one embodiment, the first member 130 may include a housing portion 230 surrounding the elastic element 205, the housing portion 250 being circumferentially in contact with the elastic element 205 and having an aperture 260. The frame 120 contacts the elastic element 205 through the aperture 260. According to one embodiment, the housing portion 250 takes the form of a cylindrically shaped wall 270 circumferentially surrounding the elastic element 205 and having open ends 235, 245. An upper portion of the cylindrically shaped wall 270 includes the aperture 260 and the frame 120 contacts the elastic element 205 through the aperture 260 in the cylindrically shaped wall 270. A first gusset 280 reinforcement and a second gusset 290 reinforcement are coupled to opposing sides of the frame 120 and are coupled to the cylindrically shaped wall 270 on either side of the aperture 260 aligning the frame 120 with the elastic element 205. The size of the aperture 260 and position of the gussets 280, 290 can be easily adjusted for different frame 120 sizes. According to one embodiment, each of the first gusset 280 and second gusset 290 are welded to the housing portion 230 of the first member 130 and are each welded to opposing sides of the frame 120.

According to one embodiment, the third member 190 is provided as a tubular shaped third member 190' having a smooth tubular shape. The elastic element 205 includes an elongated aperture 265 through the middle corresponding to the shape of the tubular shaped third member 190', and is mounted about the tubular shaped third member 190'. The first and second side walls 150, 160 of the first member 130 each include coaxial apertures 180, 185. A fastener 330 extends through the coaxial apertures 180, 185 and through the tubular shaped third member 190' coupling the third member 190 to the side walls 150, 160. In one embodiment, no fastener 330 is required and the ends of the tubular shaped 180 third member 190 are supported within the coaxial apertures 180, 185 in direct contact with the sidewalls 150, 160.

Figure 2:
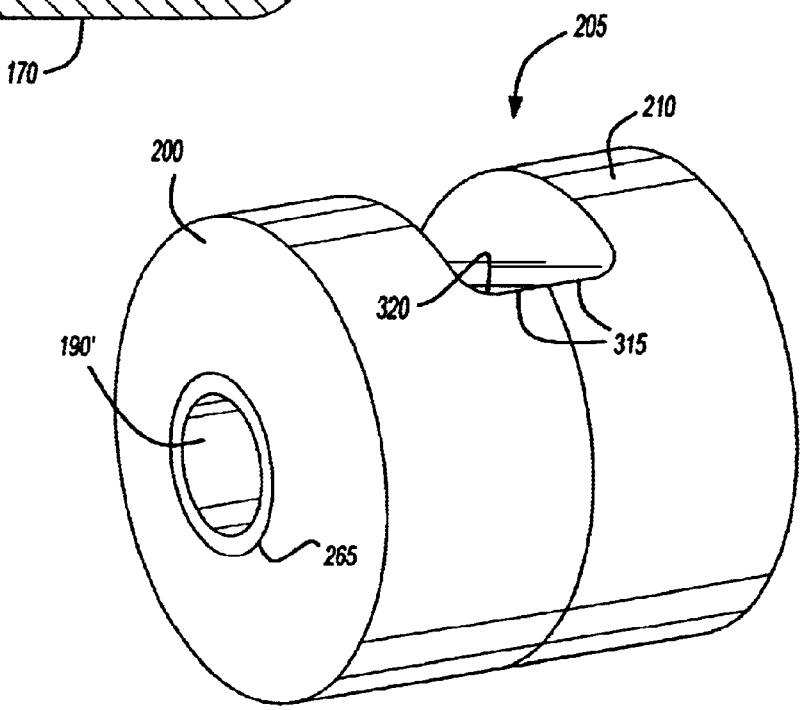
FIG. 2 illustrates an embodiment of a elastic element of the axle mount.

FIG. 2 illustrates an embodiment of a elastic element 205 of the axle mount 100. According to one embodiment, the elastic element 205 may include a central portion having a recessed notch 320 corresponding to the shape of the mating frame 120. The elastic element 205 may be provided in two pieces for ease of assembly from the open ends 235, 245 of the cylindrically shaped wall 270 and may be provided as a first bushing 200 and a second bushing 210 each having an inner portion including a recessed surface 315. The inner portion of the first bushing 200 and second bushing 210 having the recessed surface 315 abut one another and form the central notch 320. In this embodiment, the elastic element 205 includes an inner portion housed within the cylindrically shaped wall 270 and an end portion extending outside of the cylindrically shaped wall 270 between the first member 130 and the side walls 150, 160.

Figure 3:
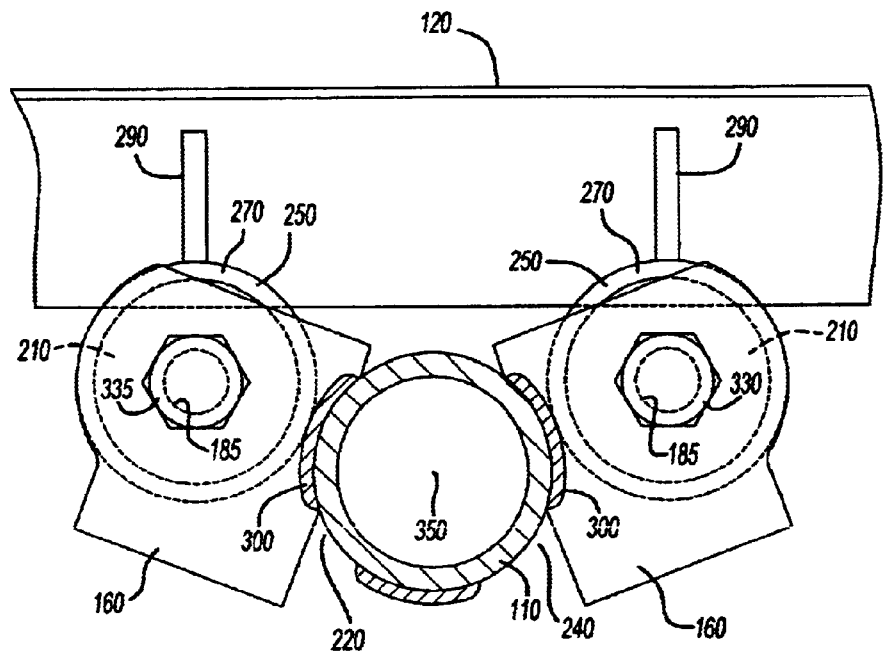
FIG. 3 illustrates a front view of an embodiment of an axle mount.

FIG. 3 illustrates a front view of an embodiment of an axle mount 100 for mounting an axle 110 to a frame 120 of a vehicle. This view further illustrates an embodiment in which the first and second side walls 150, 160 each include an arced recess 300 substantially conforming to the shape of the mating axle 110. In addition, the first and second side walls 150, 160 may interface with the upper portion of the axle 110 on the fore and aft side 240 of the axle 110. Further, the first and second side walls 150, 160 may be spaced in relation to one another by an intermediate wall 170. In this embodiment, the arced recesses 300 are oriented to be located substantially above a horizontal diameter running through the center 350 of the axle 110. This allows the axle mounts 100 to be more closely spaced minimizing the space occupied by the components at the same time providing the structural stability of dual axle mounts 100 to couple the frame 120 and axle 110.

Figure 4:
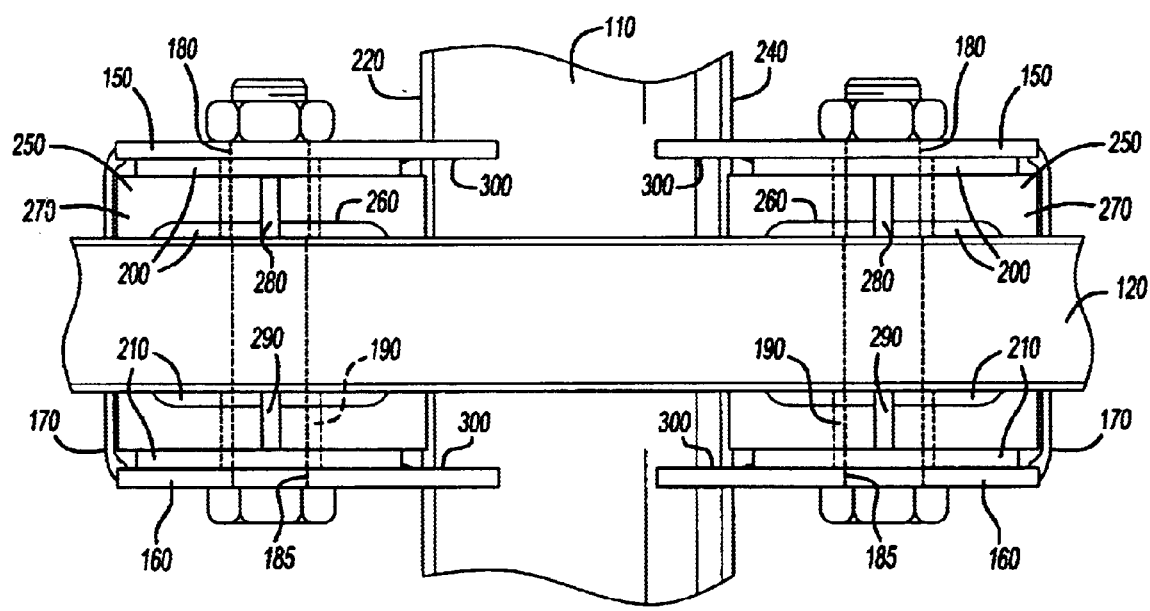
FIG. 4 illustrates a plan view of an embodiment of an axle mount.

FIG. 4 illustrates a top view of an embodiment of an axle mount 100. As can be seen in this view, the embodiment includes first and second side walls 150, 160 each having an arced recess 300 interfacing with the axle 110. The arced recess 300 can be easily adjusted to conform to axles having various diameters or shapes. According to one embodiment, the first and second sidewalls are welded to the axle 110 along the arced recess 300. The interface is oriented substantially in the upper portion of the axle 110 above a horizontal plane running through the center 350 of the axle 110. This allows the axle mounts 100 to be more closely spaced minimizing the space occupied by the components at the same time providing the structural stability of dual axle mounts 100 to couple the frame 120 and axle 110.

While the present invention has been described with reference to an exemplary component, a variety of components may be produced utilizing the apparatus and process described herein. Modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A device mounting an axle to a frame in a vehicle, comprising:
   a plurality of axle mounts, each axle mount including:
      a first member rigidly coupled to the frame;
      a second member rigidly coupled to the axle, the second member having first and second side walls;
      a third member supported by the first and second side walls of the second member; and
      an elastic element disposed about the third member and coupled to the first member;
   wherein at least one axle mount is coupled to the fore side of the axle and at least one axle mount is coupled to the aft side of the axle.

2. The device of claim 1 wherein the first member includes a wall portion having an aperture and the frame contacts the elastic element through the aperture.

3. The device of claim 1 wherein the first member includes a cylindrically shaped wall circumferentially surrounding the elastic element and having an aperture, the frame contacting the elastic element through the aperture.

4. The device of claim 3 wherein the first member includes a first gusset reinforcement and a second gusset reinforcement coupled between the cylindrically shaped wall and the frame on opposing sides of the frame and the cylindrically shaped wall.

5. The device of claim 2 wherein the elastic element includes a central portion having a recessed surface corresponding to the shape of the mating frame.

6. The device of claim 5 wherein the elastic element is comprised of a first bushing and a second bushing each having an end portion with a recessed surface, wherein the end portions of the first bushing and second bushing including the recessed surface abut one another and form the central notch.

7. The device of claim 6 wherein the elastic element includes an inner portion housed within the cylindrically shaped wall and an end portion extending outside of the cylindrically shaped wall between the first member and the side walls.

8. The device of claim 1 wherein the third member has a tubular shape.

9. The device claim 8 wherein the first and second side walls each include coaxial apertures and wherein a fastener extends through the coaxial apertures and through the tubular shaped third member coupling the third member to the side walls.

10. The device of claim 8 wherein the first and second side walls each include coaxial apertures and wherein the ends of the tubular shaped third member are supported within the coaxial apertures in direct contact with the sidewalls.

11. The device of claim 1 wherein the first and second side walls each include an arced recess substantially conforming to the shape of the mating axle.

12. The device of claim 11 wherein the first and second side walls interface with the upper portion of the axle on the fore and aft side of the axle.

\* \* \* \* \*

UNITED STATES PATENT AND TRADEMARK OFFICE
CERTIFICATE OF CORRECTION

PATENT NO. : 6,637,345 B1
DATED : October 28, 2003
INVENTOR(S) : Reaser, Harry

It is certified that error appears in the above-identified patent and that said Letters Patent is hereby corrected as shown below:

Column 4,
Line 62, please add:
13. The device of claim 12 wherein the first and second side walls are connected by an intermediate wall.

Signed and Sealed this

Twenty-fourth Day of August, 2004

JON W. DUDAS
*Director of the United States Patent and Trademark Office*